United States Patent
Perlitz et al.

(10) Patent No.: US 9,297,994 B2
(45) Date of Patent: Mar. 29, 2016

(54) GRATING-ASSISTED AUTOFOCUS DEVICE AND AUTOFOCUSING METHOD FOR AN IMAGING DEVICE

(75) Inventors: Sascha Perlitz, Jena (DE); Michael Arnz, Oberkochen (DE); Dirk Seidel, Jena (DE)

(73) Assignees: Carl Zeiss SMS GmbH, Jena (DE); Carl Zeiss SMT GmbH, Oberkochen (DE)

( * ) Notice: Subject to any disclaimer, the term of this patent is extended or adjusted under 35 U.S.C. 154(b) by 607 days.

(21) Appl. No.: 13/606,997

(22) Filed: Sep. 7, 2012

(65) Prior Publication Data

US 2013/0062501 A1    Mar. 14, 2013

Related U.S. Application Data

(60) Provisional application No. 61/533,012, filed on Sep. 9, 2011.

(30) Foreign Application Priority Data

Sep. 9, 2011    (DE) .................. 10 2011 082 414

(51) Int. Cl.
*G02B 7/04*      (2006.01)
*H04N 5/232*    (2006.01)
*G02B 21/24*    (2006.01)

(52) U.S. Cl.
CPC ............ *G02B 21/244* (2013.01); *G02B 21/245* (2013.01)

(58) Field of Classification Search
CPC .. G02B 21/241; G02B 21/244; G02B 21/002; G02B 21/00; G02B 21/044; G02B 21/0032; G02B 21/008; G02B 21/245; G03B 13/36; G03B 13/32
USPC .......... 250/201.1, 201.3, 201.7, 201.4, 201.8, 250/201.2, 204, 559.04, 559.05, 559.06, 250/559.07, 559.1; 356/445, 609, 624; 359/368, 383, 382; 348/345, 349, 350, 348/353, 356; 382/255; 396/89, 79
See application file for complete search history.

(56) References Cited

U.S. PATENT DOCUMENTS 5,206,700 A      4/1993    Reynolds et al. ............. 356/237
5,416,562 A  *   5/1995    Ota et al. ......................... 355/53
(Continued)

FOREIGN PATENT DOCUMENTS

DE    1020811    12/1957
DE    3212393    10/1983 ................ G03F 9/00
(Continued)

*Primary Examiner* — Que T Le
*Assistant Examiner* — Jennifer Bennett
(74) *Attorney, Agent, or Firm* — Fish & Richardson P.C.

(57) ABSTRACT

There is provided an autofocus device for an imaging device which has an imaging lens system with a first focal plane, an object stage for holding an object and a first movement module for the relative movement of object stage and imaging lens system, wherein the autofocus device comprises an image-recording module with a second focal plane the position of which relative to the first focal plane is known,
a second movement module for the relative movement of object stage and image-recording module, a focus module for producing a two-dimensional, intensity-modulated focusing image in a focus module plane which intersects the second focal plane and a control module which controls the image-recording module for focusing the imaging device, which then records a first two-dimensional image of the object together with the focusing image during a predetermined first exposure time, and wherein the control module, using the first two-dimensional image recorded by means of the image-recording module and taking into account the relative position of the first and second focal plane, evaluates the required changes in distance between the object stage and the imaging lens system and controls the first movement module such that the evaluated change in distance is carried out, wherein the control module controls the second movement module such that, during the first exposure time for recording the first two-dimensional image, the object stage is moved relative to the image-recording module in a plane parallel to the second focal plane.

31 Claims, 12 Drawing Sheets

(56) References Cited

U.S. PATENT DOCUMENTS

Figure 1:
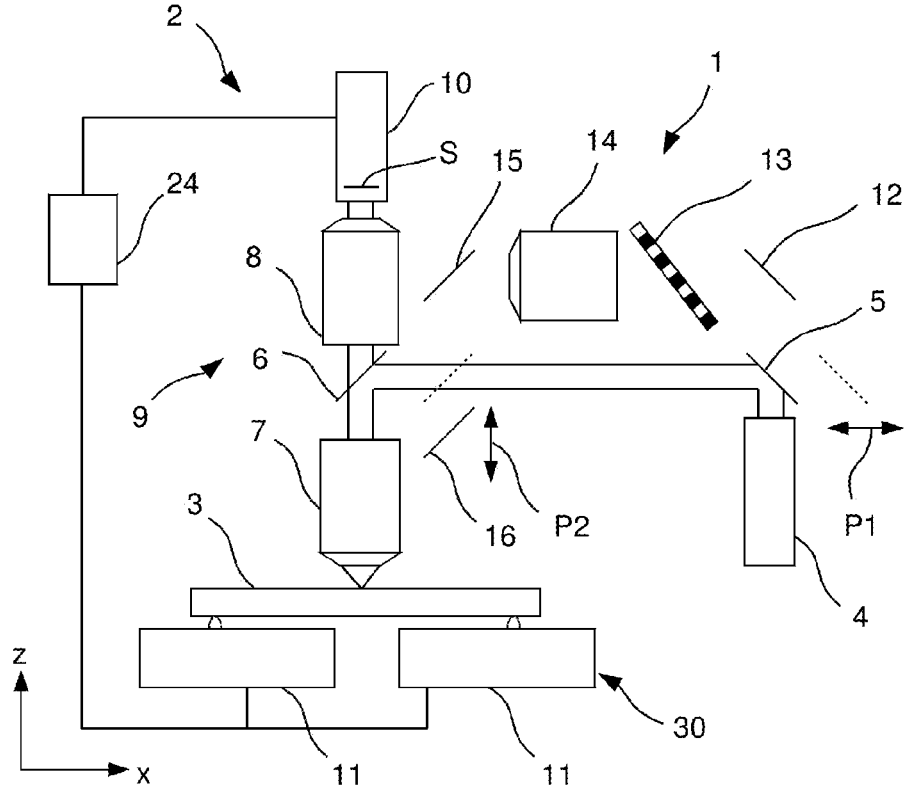

| | | | |
|---|---|---|---|
| 5,604,344 A | 2/1997 | Finarov | 250/201.3 |
| 5,757,505 A * | 5/1998 | Mizutani | 356/400 |
| 2007/0102620 A1 | 5/2007 | Bublitz et al. | 250/201.3 |
| 2010/0033811 A1 | 2/2010 | Westphal et al. | 359/368 |
| 2010/0296725 A1* | 11/2010 | Seiffert | G01B 11/2522 382/154 |
| 2011/0134308 A1 | 6/2011 | Arnz et al. | 348/345 |

FOREIGN PATENT DOCUMENTS

| | | | |
|---|---|---|---|
| DE | 3587482 | 11/1993 | B65H 7/14 |
| DE | 10319182 | 12/2004 | G02B 21/24 |
| DE | 102006027836 | 12/2007 | G02B 21/24 |
| DE | 102008005355 | 7/2009 | G02B 21/24 |
| DE | 102008005356 | 7/2009 | |
| WO | WO 2009092555 A1 * | 7/2009 | G02B 21/24 |

* cited by examiner

GRATING-ASSISTED AUTOFOCUS DEVICE AND AUTOFOCUSING METHOD FOR AN IMAGING DEVICE

CROSS-REFERENCE TO RELATED APPLICATIONS

Pursuant to 35 U.S.C. §119, this application claims the benefit of U.S. provisional patent application 61/533,012, filed on Sep. 9, 2011, and German patent application DE 102011082414.6, filed on Sep. 9, 2011. The above applications are herein incorporated by reference.

DESCRIPTION

The present invention relates to an autofocus device for an imaging which has an imaging lens system with a first focal plane, an object stage for holding an object and a first movement module for the relative movement of object stage and imaging lens system, wherein the autofocus device comprises an image-recording module with a second focal plane the position of which relative to the first focal plane is known, a second movement module for the relative movement of object stage and image-recording module, a focus module for producing a two-dimensional, intensity-modulated focusing image in a focus module plane which intersects the second focal plane and a control module which controls the image-recording module, which then records a first two-dimensional image of the object together with the focusing image during a predetermined first exposure time, and wherein the control module, using the first two-dimensional image recorded by means of the image-recording module and taking into account the relative position of the first and second focal plane, evaluates the required change in distance between the object stage and the imaging lens system and controls the first movement module such that the evaluated change in distance is carried out for focusing the imaging device as well as an auto autofocusing method for an imaging device which has an imaging lens system with a first focal plane, an object stage for holding an object and a movement module for the relative movement of object stage and imaging lens system, wherein an image-recording module is provided with a second focal plane the position of which relative to the first focal plane is known, a two-dimensional, intensity-modulated focusing image is produced in a focus module plane which intersects the second focal plane, a first two-dimensional image of the object together with the focusing image is recorded by means of the image-recording module during a predetermined first exposure time, the required change in distance between the object stage and the imaging lens system is evaluated using the first two-dimensional image recorded by means of the image-recording module and taking into account the relative position of the first and second focal plane and the movement module is controlled such that the evaluated change in distance is carried out.

Such an autofocus device is known for example from DE 10 2008 005 356 A1. The basic principle of such an autofocus device is to image an intensity-modulated grating image tilted onto the object to be focused and record it via a camera. The contrast varying laterally in the image can then be evaluated in order to establish the defocusing in the direction of recording.

However, the problem often arises that structures of the object result in an undesired modulation of the intensity of the imaged grating image. As the structures can vary from object to object, unforeseeable intensity variations can occur which result in a reduction of the precision when determining the focusing and thus also in a reduction of the focusing precision of the autofocus device.

Starting from this, the object of the invention is to develop an autofocus device of the type mentioned at the outset such that a higher focusing precision can be achieved. Further, an autofocusing method of the type mentioned at the outset is to be improved in respect of its focusing precision.

The object is achieved with an autofocus device of the type mentioned at the outset in that the control module controls the second movement module such that, during the first exposure time for recording the first two-dimensional image, the object stage is moved relative to the image-recording module in a plane parallel to the second focal plane.

As a result of the relative movement of the object stage, the object is thus also moved relative to the image-recording module during the first exposure time for recording the first two-dimensional image, with the result that structurings of the object in the first picture (first two-dimensional image) become somewhat blurred. This leads to a reduction in the intensity modulation caused by the structuring of the object in the first two-dimensional image, as a result of which a much more precise determination of the present defocusing of the object is possible, which results in a higher focusing precision for the imaging device.

The relative movement of object stage and image-recording module (in particular during the exposure time) caused by the second movement module is preferably realized by moving or driving the object stage. Alternatively it is possible not to move the object stage and instead to shift the image-recording module in order to achieve the relative movement of the object stage relative to the image-recording module in a plane parallel to the second focal plane. It is also possible for both the object stage and the image-recording module to be moved in order to achieve the relative movement according to the invention in the plane parallel to the second focal plane.

In order to change the distance between the object stage and the imaging lens system by means of the first movement module, either the imaging lens system or the object stage can be moved. Naturally, it is also possible to move both the object stage and the imaging lens system in order to carry out the desired change in distance.

In particular, the control module can control the second movement module such that, during the first exposure time, the object stage is moved relative to the image-recording module at a constant speed. Particularly good improvements in focusing precision were able to be achieved by this measure.

The control module can control the second movement module such that, during the first exposure time, the object stage is moved relative to the image-recording module in (only) a single direction. This makes it easier to drive the object stage and is technically simple to achieve.

With the autofocus device according to the invention, the control module can control the second movement module such that, during the first exposure time, the object stage is moved relative to the image-recording module in at least two different directions. In particular, the object stage can be moved relative to the image-recording module along any two-dimensional trajectory, such as e.g. a circle, an ellipsis, a rectangle, a square, a spiral, etc.

In particular, the focusing image can be periodically intensity-modulated in a first direction and the control module can control the second movement module such that, during the first exposure time, the object stage is moved relative to the image-recording module in a second direction which is not perpendicular to the projection of the first direction onto the second focal plane. The movement direction of the object stage relative to the image-recording module is preferably parallel to the projection of the first direction onto the second focal plane. Thus a particularly high adjustment precision can be achieved.

With the autofocus device according to the invention, the control module can control the second movement module such that, during the first exposure time, the object stage covers a distance relative to the image-recording module which corresponds at least to the length of a period of the focusing image along the second direction in the second focal plane. The distance covered can preferably correspond to an extension of the image field of the image-recording module. If the object has periodically arranged structures, the control module can control the object stage such that, during the first exposure time, the latter covers a distance which is greater than or equal to the period length of the periodically arranged structures. In particular, the distance covered can lie in the range of from one to a thousand times the length of the period length of the periodically arranged structures (in particular along the second direction in the second focal plane).

With the autofocus device, the first and the second focal plane can coincide. This can be the case e.g. when the imaging lens system of the imaging device is used as image-recording module. This has the additional advantage that a separate image-recording module need not be provided. The imaging lens system already present can be used for the autofocusing. In this case, the first and second movement module can also be the same movement module.

With the autofocus device according to the invention, in order to establish the change in distance between the object stage and the imaging lens system, the control module can evaluate the first picture (or first two-dimensional image) for intensity variations and/or the contrast trend.

In particular, the image-recording module can have a two-dimensional image sensor, such as e.g. a CCD or CMOS sensor. The image-recording module can for example confocally detect the object together with the focusing image imaged thereon in the second focal plane. In this case, the focusing image can be for example a confocal point illumination or line illumination, as is known in the case of confocal microscopes.

When the image-recording module carries out a confocal detection to record the two-dimensional image, at least one geometric extension of the recorded focusing image can be evaluated to establish the required change in distance between the object stage and the imaging lens system. In the case of a confocal point illumination, this can be e.g. the diameter of the recorded point.

With the confocal detection, in the case of a slit-shaped diaphragm in the image-recording module the object stage is moved relative to the image-recording module during the exposure time not parallel to the slit, but transverse thereto (preferably perpendicular thereto), and in the case of a circular diaphragm in the image-recording module moved in one or several directions.

The control module can average out structurings of the object recorded in the recorded first two-dimensional image, wherein this averaging is preferably carried out along the movement direction of the object stage relative to the image-recording module during the first exposure time.

In particular, with the autofocus device according to the invention, the object can be positioned by means of the second movement module in the second focal plane (and thus without object displacement) before the recording during the first exposure time is carried out.

The focus module preferably contains an illumination source which emits incoherent or partially coherent illumination radiation, and a transmission grating to produce the focusing image. The transmission grating preferably has a periodically varying transmission behaviour in a first direction.

Naturally, the grating can be formed not only as a transmissive grating, but also as a reflective grating. In particular, it is possible to produce the grating by means of a spatial light modulator, such as e.g. a tilting mirror matrix. The grating can not only be passive (i.e. be illuminated), it is also possible to form the grating active. For this, for example even self-illuminating light modulators, such as e.g. OLED modulators, can be used.

The autofocus device according to the invention can be a constituent of the imaging device. In particular, the imaging device can be formed as a microscope. It is preferably a microscope in the field of the examination of lithography masks and/or wafers for the semiconductor industry.

There is further provided an imaging device comprising an imaging lens system with a first focal plane, an object stage for holding an object, a first movement module for the relative movement of the object stage and imaging lens system, and an autofocus device, wherein the autofocus device comprises an image-recording module with a second focal plane, the position of which relative to the first focal plane is known, a second movement module for the relative movement of object stage and image-recording module, a focus module for producing a two-dimensional intensity-modulated focusing image in a focus module plane which intersects the second focal plane and a control module which controls the image-recording module, which then records a first two-dimensional image of the object together with the focusing image during a predetermined first exposure time, wherein the control module controls the second movement module such that, during the first exposure time for recording the first two-dimensional image, the object stage is moved relative to the image-recording module in a plane parallel to the second focal plane, and wherein the control module, using the first two-dimensional image recorded by means of the image-recording module and taking into account the relative position of a first and second focal plane, evaluates the required change in distance between the object stage and the imaging lens system and controls the first module such that the evaluated change distance is carried out, wherein the imaging device, after carrying out the evaluated change in distance, records a second two-dimensional image of the object by means of the imaging lens system, and wherein the object stage and/or the object is not moved relative to the imaging lens system in a plane parallel to the first focal plane during a second exposure time for recording the second two-dimensional image.

The plane parallel to the first focal plane can be distant from the first focal plane or both planes can be located at the same position.

Since the object stage and/or the object is not moved during the second exposure time, the object is not moving during the second exposure time leading to the possibility to record the second two-dimensional image with high quality (e.g. high resolution).

The second two-dimensional image can be recorded with or without the focusing image. In particular, it is recorded without the focusing image. This can be achieved such that the focus module does not produce the focusing image during the second exposure time for recording the second two-dimensional image.

In particular, the object stage and/or the object is not moved relative to the imaging lens system during the second exposure time.

The autofocus device of the imaging device can comprise further features of the above described autofocus device.

The object is further achieved with an autofocusing method of the type mentioned at the outset in that, during the first exposure time for recording the first two-dimensional image, the object stage is moved relative to the image-recording module in a plane parallel to the second focal plane.

Thus, during the recording, a virtually mechanical blurring of the structuring of the object is carried out, as a result of which the defocus determination and thus the autofocusing can be carried out with a higher degree of precision.

Developments of the autofocusing method according to the invention are given in the dependent method claims.

There is further provided a use of the autofocusing device according to the invention (including its development) with an imaging device which has an imaging lens system with a first focal plane, an object stage for holding an object and a first movement module for the relative movement of object stage and imaging lens system in order to measure the distance between and/or the position of two or more marks of the object. For this, with the autofocusing device according to the invention each of the two marks can be focused and then recorded, and the distance between the two marks can be measured using the pictures as well as the movement of the object stage relative to the imaging lens system between the pictures.

There is further provided an imaging method for an imaging device which has an imaging lens system with a first focal plane, an object stage for holding an object and a movement module for the relative movement of object stage and imaging lens system, wherein an image-recording module is provided with a second focal plane, the position of which relative to the first focal plane is known, a two-dimensional, intensity-modulated focusing image is produced in a focus module plane which intersects the second focal plane, a first two-dimensional image of the object together with the focusing image is recorded by means of the image-recording module during a predetermined first exposure time, wherein during the first exposure time for recording the first two-dimensional image, the object stage is moved relative to the image-recording module in a plane parallel to the second focal plane, the required change in distance between the object stage and the imaging lens system is evaluated using the first two-dimensional image recorded by means of the image-recording module and taking into account the relative position of the first and second focal plane and the movement module is controlled such that the evaluated change in distance is carried out, wherein, after carrying out the evaluated change in distance, a second two-dimensional image of the object is recorded by means of the imaging lens system and wherein the object stage and/or the object is not moved relative to the imaging lens system in a plane parallel to the first focal plane during a second exposure time for recording the second two-dimensional image.

The plane parallel to the first focal plane can be distant from the first focal plane or both planes can be located at the same position.

Since the object stage and/or the object is not moved relative to the imaging lens system in a plane parallel to the first focal plane during the second exposure time, no blurring of the structuring of the object is carried out so that the second image can be recorded with high quality, since the object is autofocused with higher degree of precision and is not moving during the second exposure time.

The recording of the second two-dimensional image can be carried out with or without the focusing image.

In particular, the object stage and/or the object is not moved relative to the imaging lens system during the second exposure time.

It is understood that the features mentioned above and those yet to be explained below can be used, not only in the stated combinations, but also in other combinations or alone, without departing from the scope of the present invention. In particular, the autofocus device according to the invention can be developed such that with it the autofocusing method according to the invention as well as the developments of the autofocusing method according to the invention can be carried out. Further, the autofocusing method according to the invention can be developed such that it contains the method steps of the autofocus device according to the invention as well as its developments.

The imaging method according to the invention can be developed such that it contains the method steps of the imaging device according to the invention as well as its developments. The imaging device according to the invention can be developed such that with it the imaging method according to the invention as well as the developments of the imaging method according to the invention can be carried out.

Figure 2:
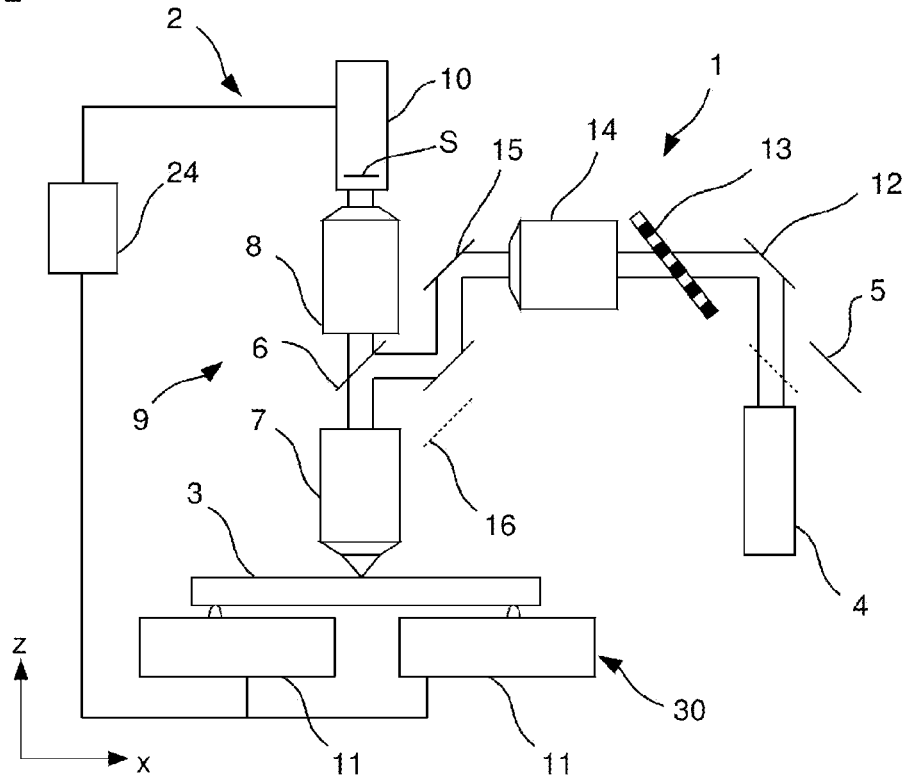
Figure 3:
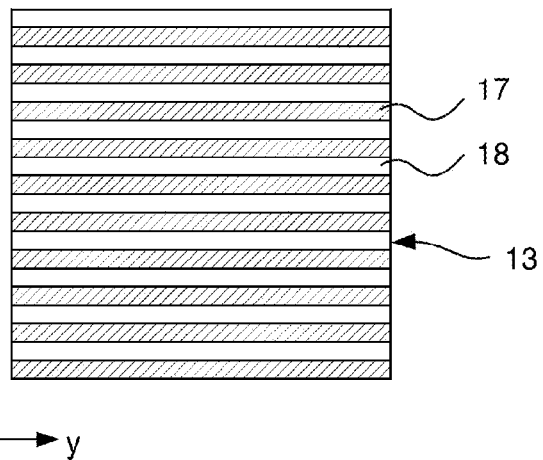
Figure 4:
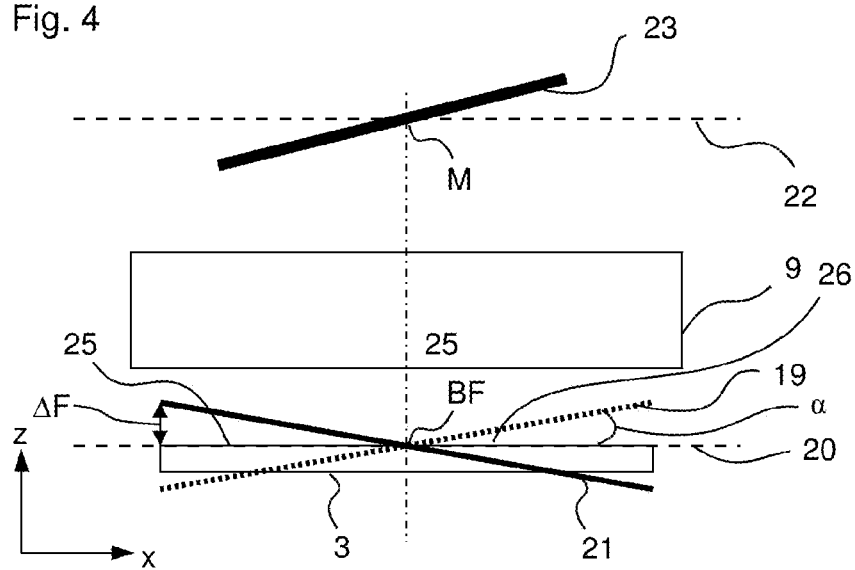
Figure 5:
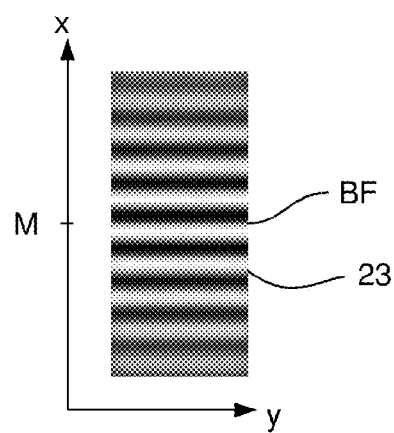
Figure 6:
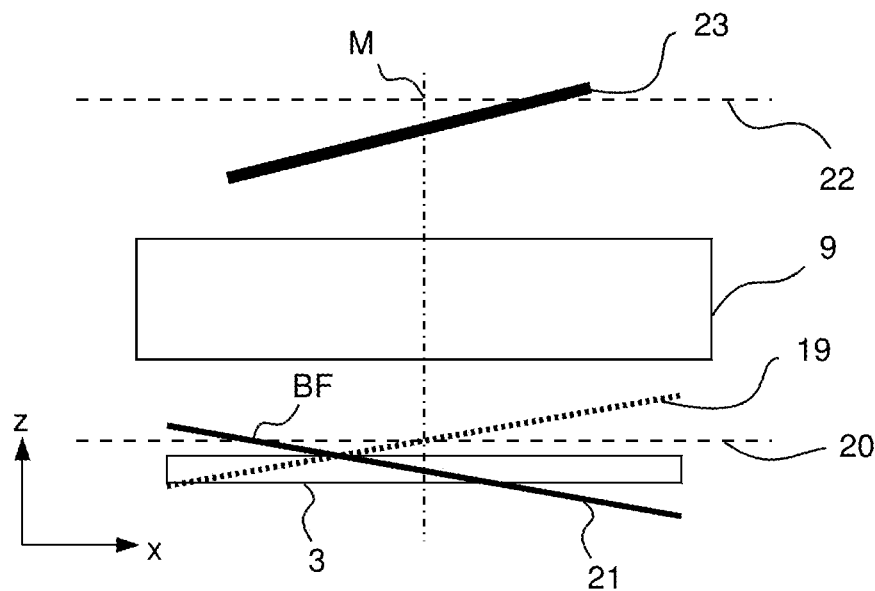
Figure 7:
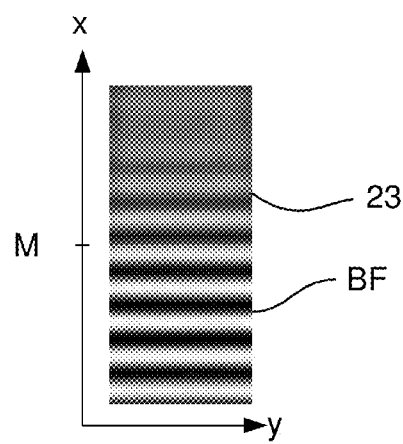
Figure 8:
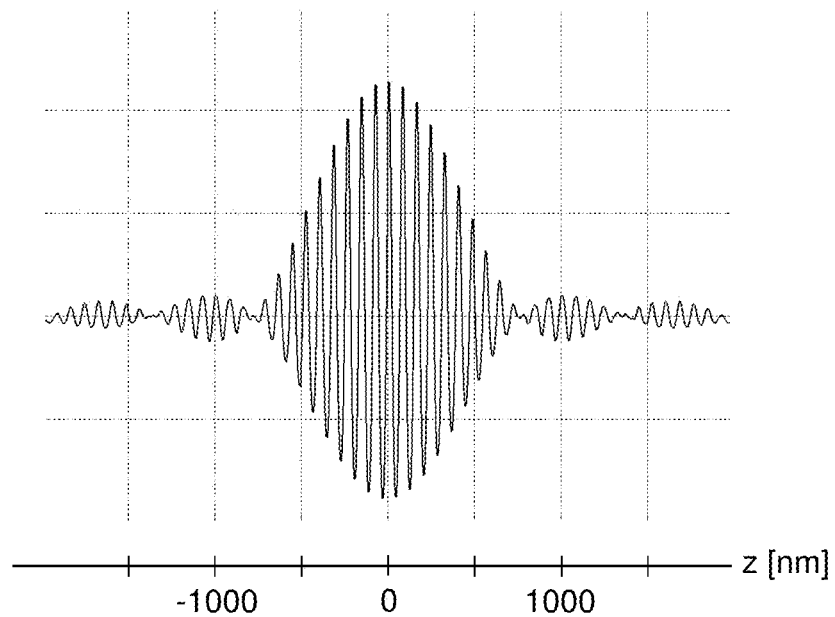
Figure 9:
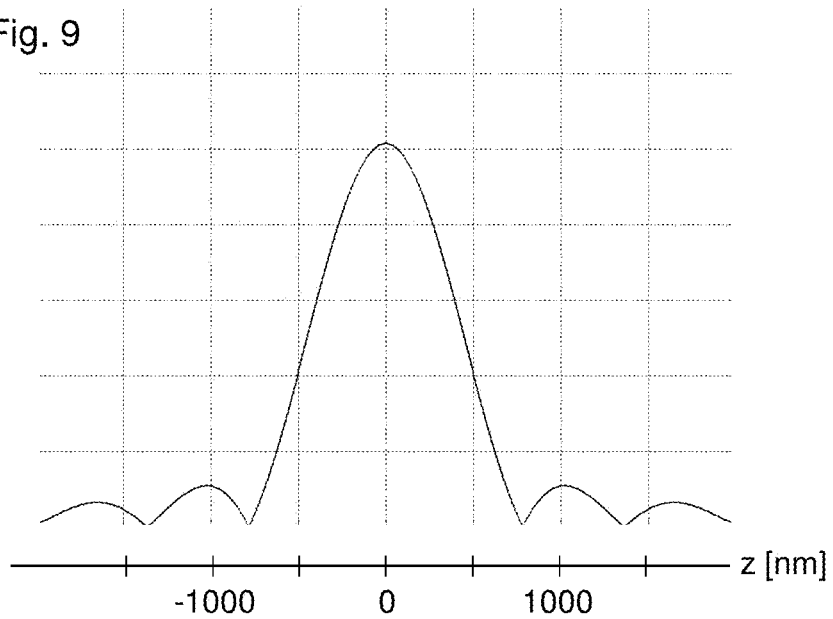
Figure 10:
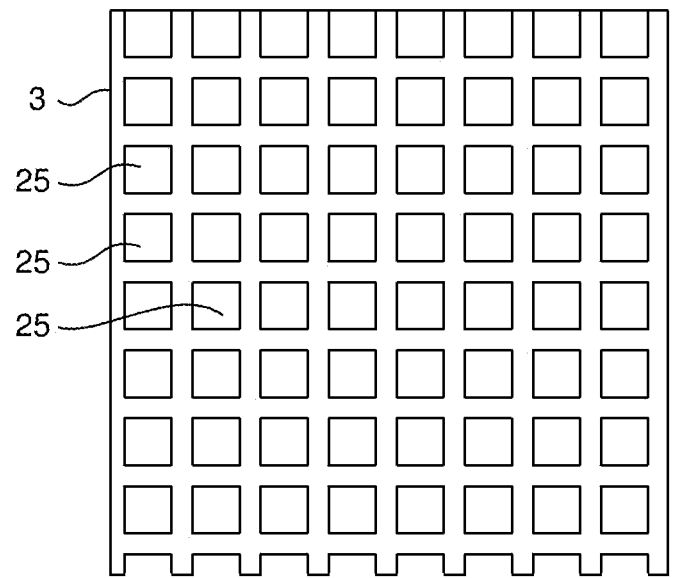
Figure 13:
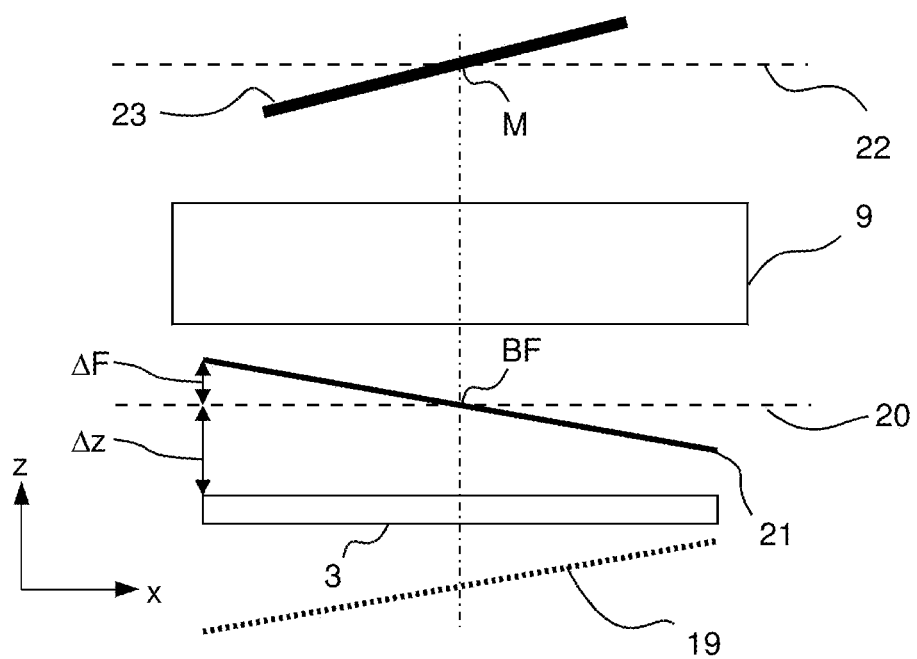
Figure 11:
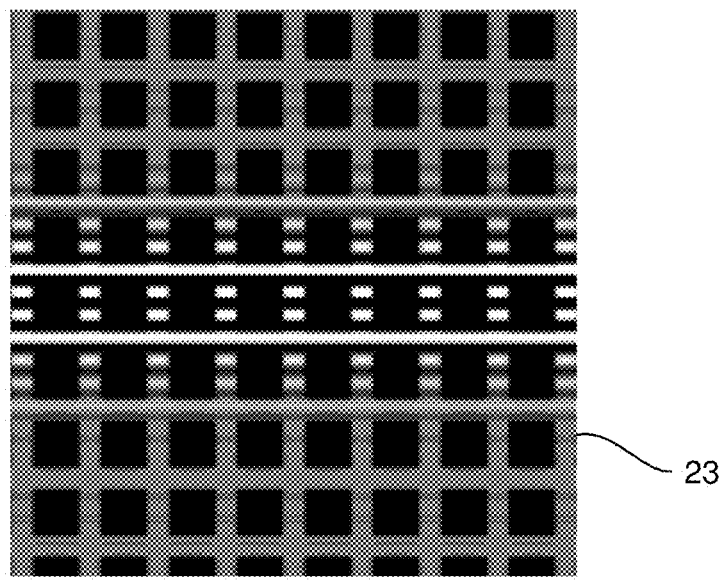
Figure 12:
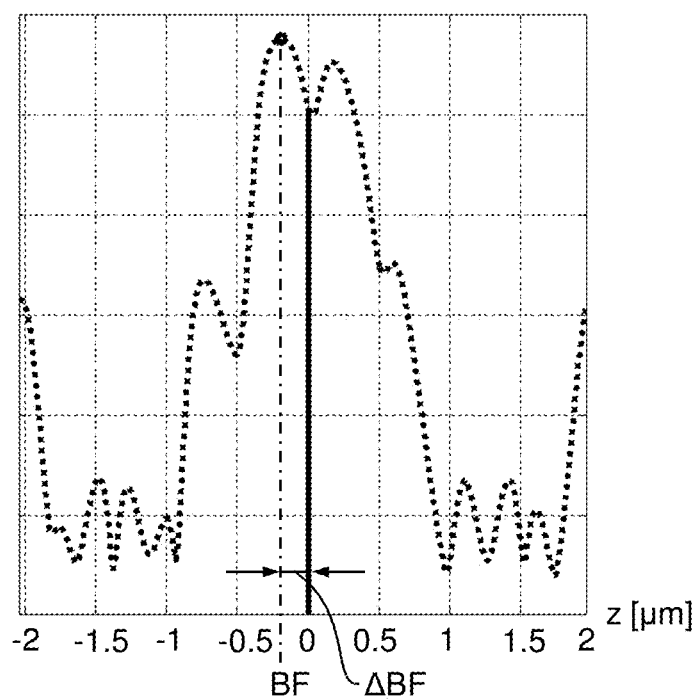
Figure 14:
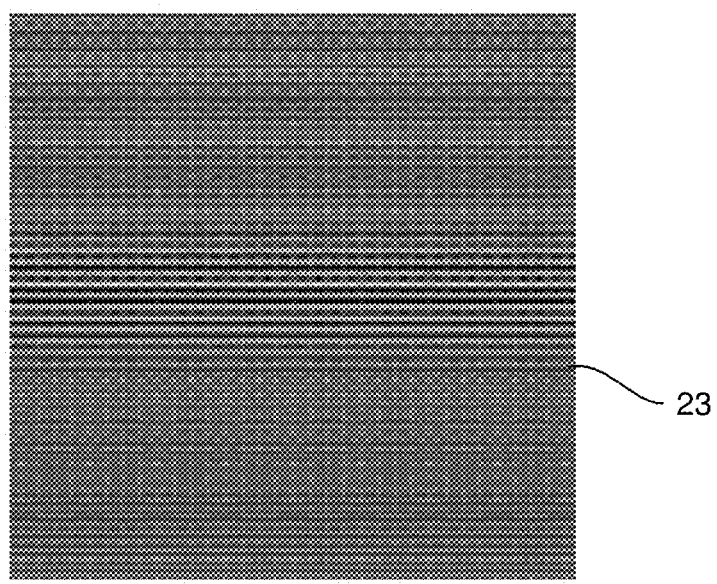
Figure 15:
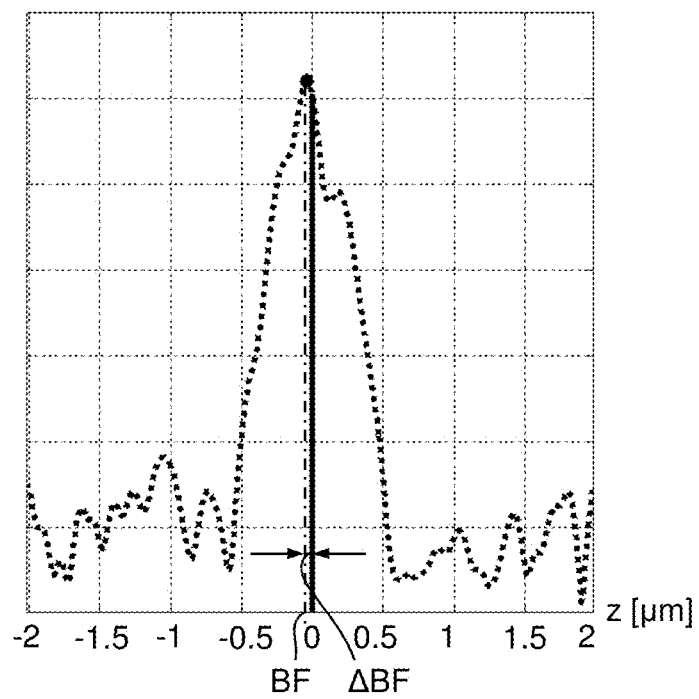
Figure 16:
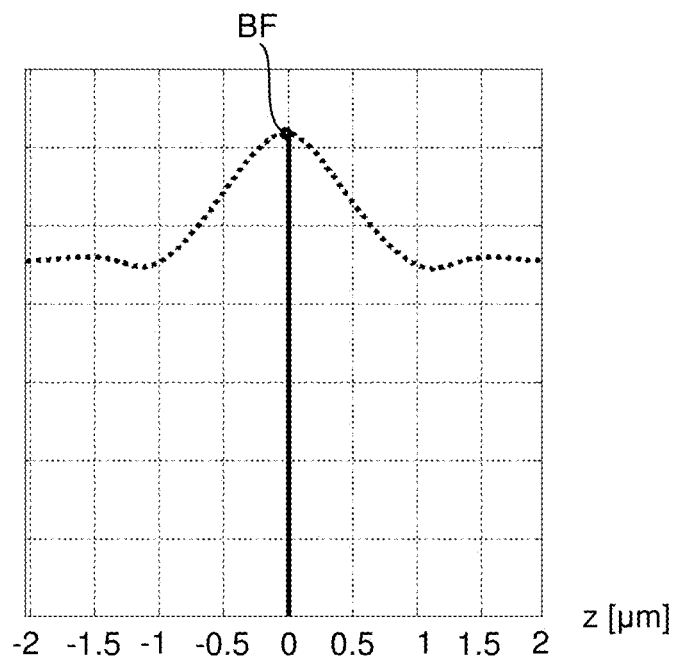
Figure 17:
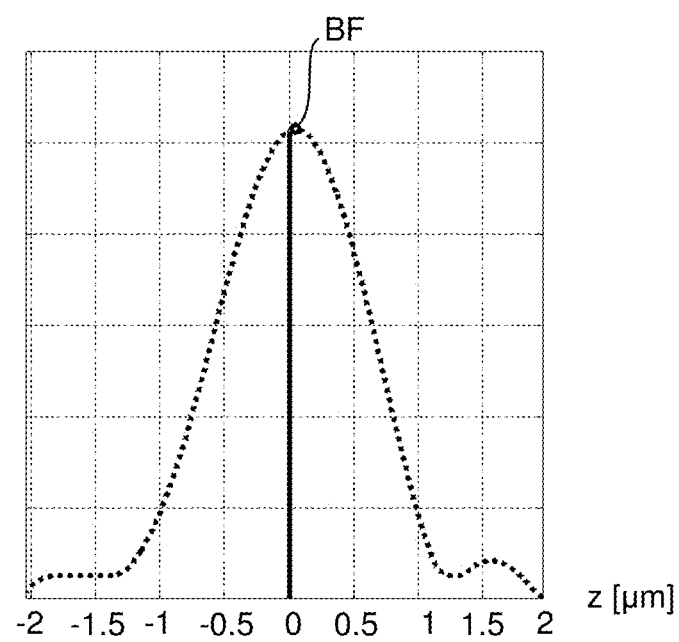
Figure 18:
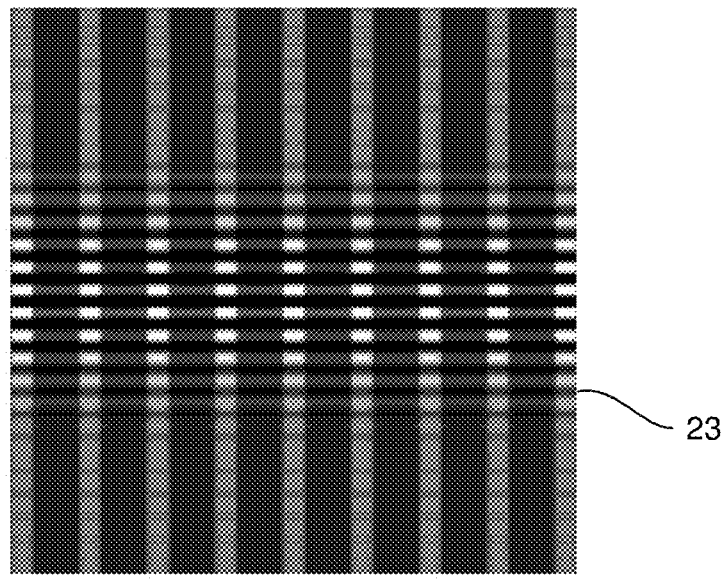
Figure 19:
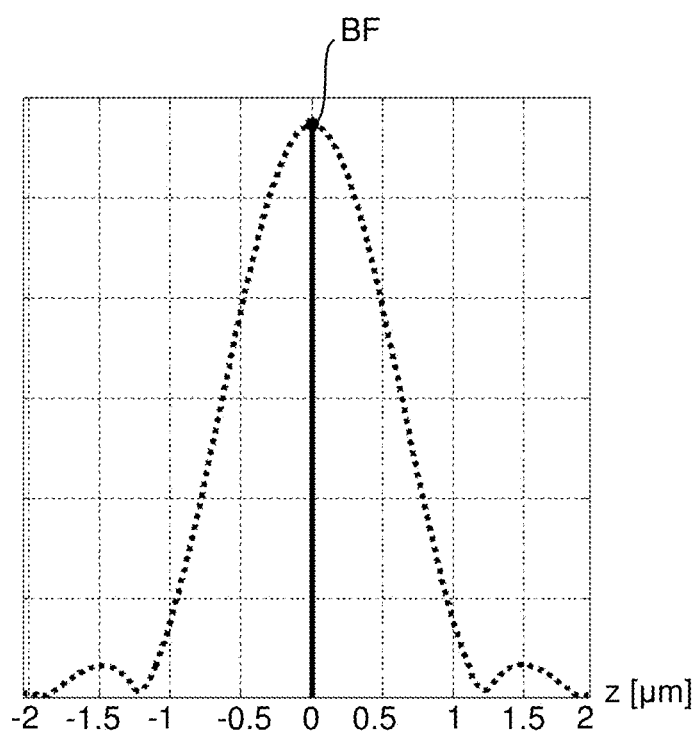
Figure 20:
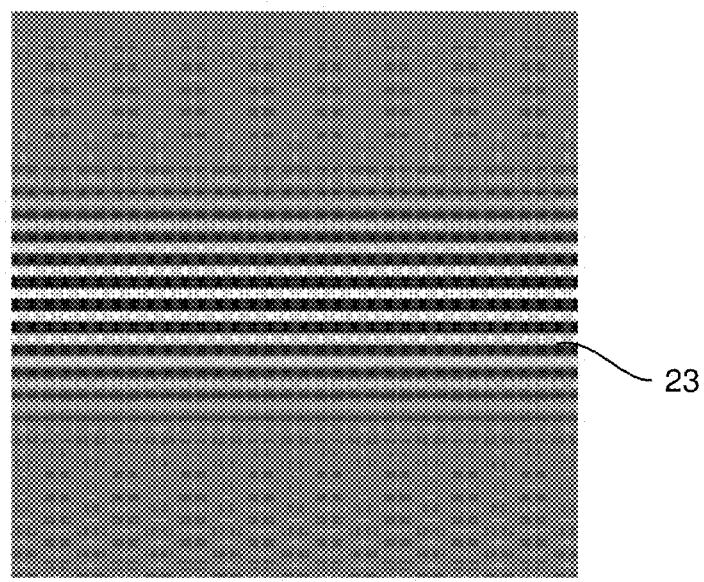
Figure 21:
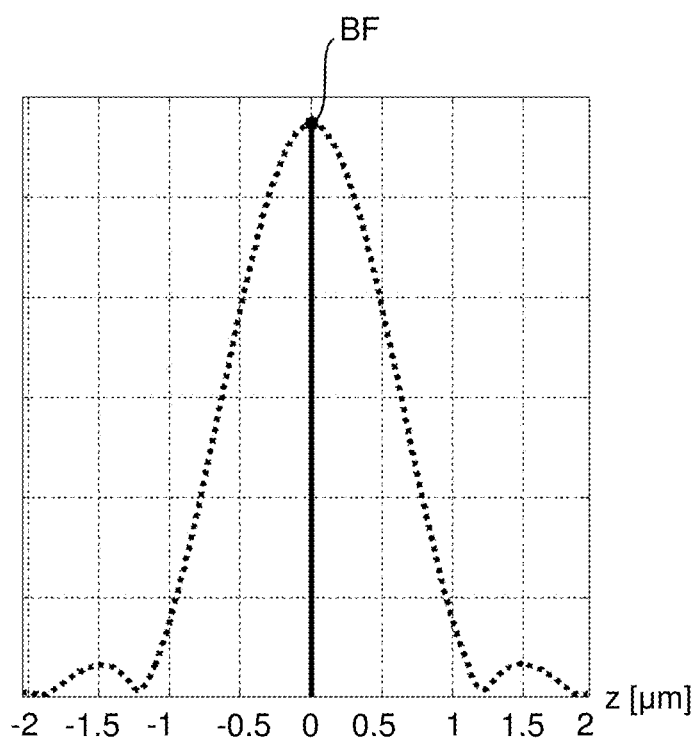
Figure 22:
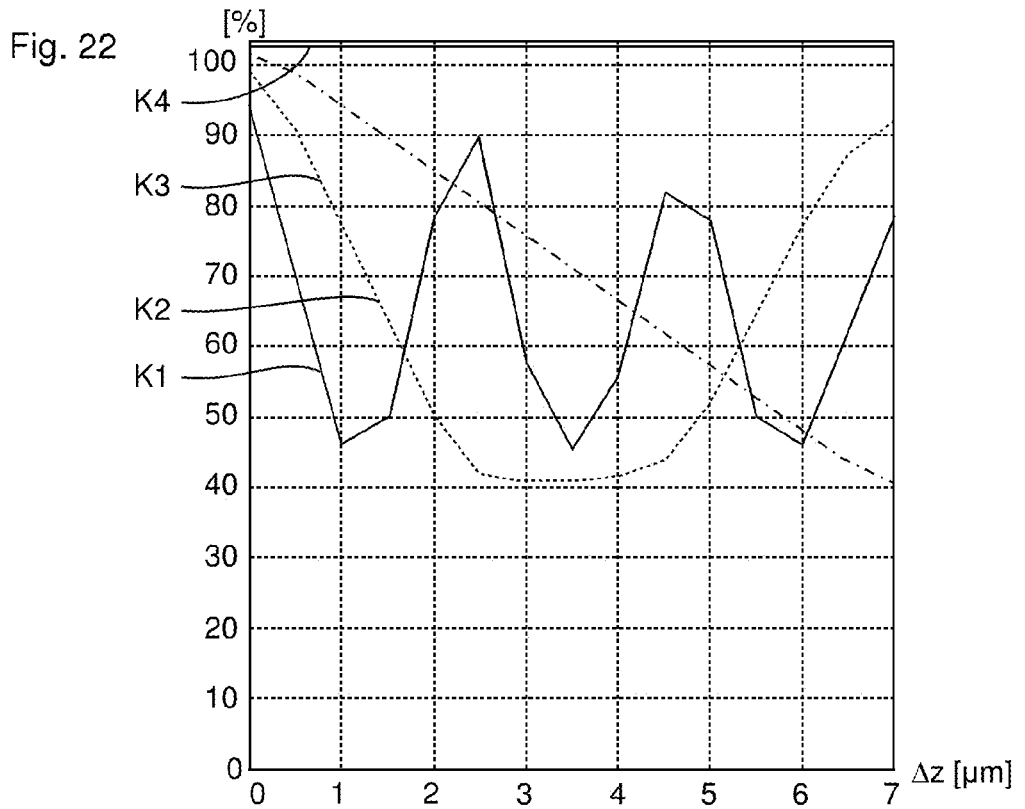
Figure 23:
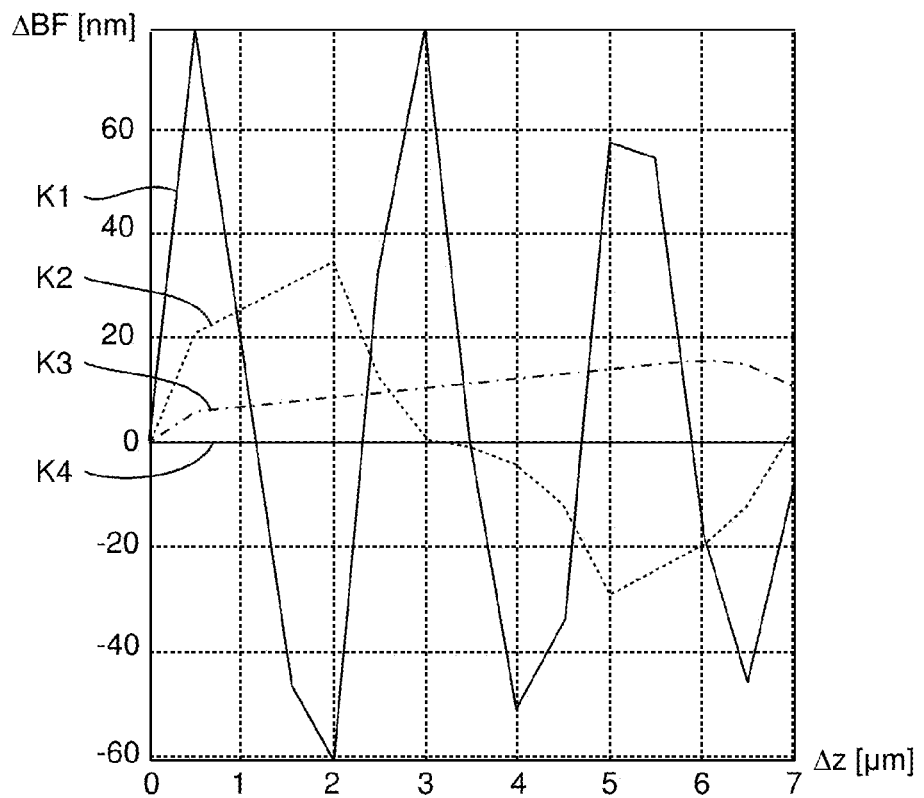
Figure 24:
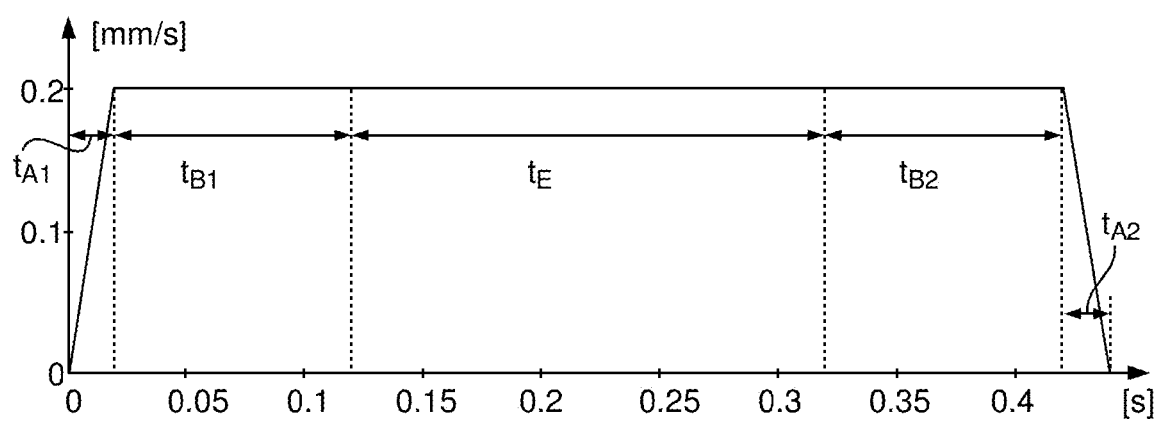

The invention is explained in further detail below by way of example with reference to the attached drawings which also disclose features useful to the invention. There are shown in:

FIG. 1 a first embodiment of the autofocus device according to the invention;

FIG. 2 a further representation of the first embodiment of the autofocus device according to the invention;

FIG. 3 a top view of the transmission grating 13 of FIGS. 1 and 2;

FIG. 4 a schematic representation to illustrate the determination of the defocusing based on an imaging of the tilted grating 13;

FIG. 5 a schematic representation of the aerial image 23 recorded by the detector S of the CCD camera 10;

FIG. 6 a schematic representation to illustrate the displacement of the reflected focusing image in the case of a defocusing of the object;

FIG. 7 a schematic representation of the picture of the CCD detector S of camera 10 of the aerial image 23 of the reflected focusing image of FIG. 6;

FIG. 8 a representation of the intensity profile of the picture of FIG. 5;

FIG. 9 a representation of the contrast profile derived from the intensity profile of FIG. 8;

FIG. 10 a schematic view of a structuring of the object 3;

FIG. 11 a schematic representation of the aerial image when using the object according to FIG. 10;

FIG. 12 a representation of the contrast profile derived from the picture of FIG. 11;

FIG. 13 a representation to illustrate the arrangement of the object 3 with a predetermined object displacement $\Delta z$ relative to the focal plane 20 to determine the defocusing;

FIG. 14 a schematic representation of the aerial image when providing a specific object displacement $\Delta z$ according to FIG. 13;

FIG. 15 a schematic representation of the contrast profile which is derived from the representation of FIG. 14;

FIG. 16 a further contrast profile for a different object structuring and without object displacement;

FIG. 17 a contrast profile for a different object structuring with object displacement;

FIG. 18 a schematic representation of an aerial image which was recorded according to the method according to the invention with a movement of the object during the recording by means of the detector S of the CCD camera 10 and without object displacement Δz;

FIG. 19 a schematic representation of the contrast profile which was obtained from the picture according to FIG. 18;

FIG. 20 a schematic representation of an aerial image which was recorded according to the method according to the invention with a movement of the object during the recording by means of the detector S of the CCD camera 10 and with object displacement Δz;

FIG. 21 a contrast profile which was obtained from the picture according to FIG. 20;

FIG. 22 a representation of the autofocus contrast in the case of the method according to the invention as a function of the chosen object displacement Δz for different distances between the contact hole maskings 25 according to FIG. 10;

FIG. 23 a representation of the error when determining the site of the best focusing as a function of the object displacement Δz for different distances between the contact hole maskings 25 according to FIG. 10, and FIG. 24 a representation to illustrate the achievement of a constant speed of the object stage during the exposure time of the recording.

With the embodiment shown in FIGS. 1 and 2, the autofocus device 1 according to the invention is integrated in a microscope 2 for the examination of lithography masks 3.

The microscope 2 comprises an illumination source 4 which emits incoherent or partially coherent illumination radiation with a wavelength of e.g. 193 nm. The illumination radiation is fed via a first deflecting mirror 5 and a second deflecting mirror 6 to the imaging lens 7 and directed by means of same onto the lithography mask 3 for illumination (FIG. 1).

The lithography mask 3 or the object 3 is imaged via the imaging lens 7, the partly transparent deflecting mirror 6 as well as a tube lens system 8, which together form an imaging lens system 9, onto a CCD camera 10 in order to produce an image of a part of the object 3. For example, with the microscope 2 the lateral position of alignment marks of the lithography mask 3 can be determined with a high degree of precision.

The microscope 2 further has an object stage 11 with which the object 3 can be positioned both laterally (i.e. in y direction=perpendicular to the drawing plane as well as in x direction) and in observation direction (i.e. in z direction). The object stage 11 thus forms a movement module 30 for the relative movement of object stage 11 and imaging lens system 9. Alternatively, the movement module 30 can be formed such that the object stage 11 is moved only in x and y direction and the imaging lens system 9 is moved in z direction. It is also possible for example that only the imaging lens system is moved in x, y and z direction.

The autofocus device 1 uses the illumination source 4 as well as the imaging lens 7 of the microscope 2 to illuminate the object 3 with a focusing image and uses the imaging lens 7, the tube lens system 8 and the CCD camera 10 to record the focusing image imaged onto the object 3.

For this, firstly the first deflecting mirror 5 can be shifted (indicated by the double arrow P1) such that it can be moved out of the beam path of the illumination radiation coming from the illumination source 4, as is shown in FIG. 2. Therefore, the illumination radiation is incident on a third deflecting mirror 12 which deflects the illumination radiation through a grating 13 tilted by 45° relative to the propagation direction of the illumination radiation. However, the tilt angle can also be any other angle from the range between 0 and 90°.

The grating structure is imaged onto the object 3 via an autofocus lens system 14, two further deflecting mirrors 15, 16, the second deflecting mirror 6 as well as the imaging lens 7. The deflecting mirror 16 is provided movable (double arrow P2) such that it can be moved from the position shown in FIG. 1 into the position shown in FIG. 2 in order to make possible the imaging of the focusing image onto the object 3.

As is shown in FIG. 3, the grating 13 can for example be formed as a line grating which has alternate transparent strips 17 and non-transparent strips 18 (shown shaded). The grating lines (strips 17, 18) extend in y direction with the result that the grating period extends in x direction during imaging onto the object 3 (due to the tilt shown in FIGS. 1 and 2).

To illustrate the present invention, the principle of establishing the focal position with the aid of a recording of the grating 13 imaged tilted onto the object 3 is firstly described with reference to FIGS. 4-7.

As a result of the tilt of the grating 13 and the reduced imaging of the grating 13 by means of the autofocus lens system 14 and the imaging lens 7 with a numerical aperture of 0.6, the angle α enclosed by the focusing plane, or the focus module plane in which the focusing image 19 lies, and the focal plane 20 of the imaging lens system 9 of the microscope 2 is approximately 9°. In the representation shown in FIG. 4 it is assumed that the object 3 or its upper side is positioned exactly in the focal plane 20. The grating 13 imaged onto the object 3 and thus the focusing image 19 is reflected at the object 3, as is indicated by the continuous line 21, and imaged as aerial image 23 by means of the imaging lens system 9 into the detector plane 22 of the CCD two-dimensional sensor S (shown schematically in FIGS. 1 and 2) of the CCD camera 10.

With optimum focusing (i.e. positioning of the object 3 in the focal plane 20), the CCD detector sees the (aerial) image 23 indicated in FIG. 5 when the object 3 itself has no structure and thus can be regarded as idealized mirror. Once the focusing image 19 in FIG. 4 intersects the focal plane 20 in the middle (seen in x direction), the reflected focus image 21 also intersects the focal plane 20 in the middle, as a result of which the site of the best focusing BF of the reflected focusing image 21 lies in the middle and the aerial image 23 of the reflected focusing image 21 at the CCD detector is at its sharpest in the middle M and decreases to the outside in both directions (in x direction and in -x direction). The same applies to the contrast in the aerial image 23.

Due to the chosen tilt of the grating 13 and the reduction in the imaging of the grating 13, the distance ΔF of the edge of the reflected focus image 21 from the focal plane 20 is here 2 μm.

When e.g. the object 3 is somewhat defocused because it is positioned somewhat below the focal plane 20, as is shown in FIG. 6, this leads to a shift of the site of the best focusing BF of the reflected aerial image 23. As a result, there is also a shift in the site of the sharpest imaging in the aerial image 23 at the CCD detector, as is indicated e.g. in FIG. 7. A defocusing of the object 3 (i.e. a deviation in z direction) leads to a lateral shift (in x direction) of the site of the sharpest imaging in the aerial image 23.

The aerial image 23 recorded by means of the CCD camera is fed to a control unit 24 (FIGS. 1 and 2) of the autofocus device 1. The control unit 24 can, for example for every x value of the aerial image, carry out an averaging in perpendicular direction thereto in order to derive an intensity profile dependent only on the x coordinate. Once the tilt angle of the grating 13, the reduction factor when illuminating the object 3 as well as the magnification factor when recording the aerial image 23 are known, the established intensity can be plotted as a function of the distance z from the focal plane 20, as is shown in FIG. 8. The intensity of the aerial image 23 of FIG. 5 is plotted in FIG. 8, i.e. the object 3 is focused in optimum manner. Thus the intensity maximum is z=0 nm (site of the optimum focusing), with the result that the calculated defocusing BF is also equal to 0 nm. The defocusing BF here gives the deviation in nm of the upper side of the object from the focal plane 20.

The contrast profile shown in FIG. 9 can be derived from the intensity profile by means of a convolution operation. The position of the contrast maximum corresponds to the defocusing, which is zero here, as the contrast maximum is z=0 nm.

However, it has been shown that the structuring present on the object 3 results in an undesired intensity modulation of the recorded aerial image 23, which causes an error ΔBF when calculating the defocusing BF.

A structuring of the object 3 is shown schematically in FIG. 10, wherein this structuring corresponds for example to a contrast hole mask in which a plurality of contact hole maskings 25 (which are drawn schematically as squares in FIG. 10) are arranged at regular intervals in lines and columns.

In the case of the aerial image 23, this results in the intensity modulation shown schematically in FIG. 11. The corresponding contrast profile, which is established in the same way as the contrast profile according to FIG. 9, is shown in FIG. 12. As can be seen in the representation, this results in the example shown here in an error in the determination of the site of the best focusing BF of ΔBF=191 nm.

It can then be attempted to reduce this error by no longer giving the object 3 the optimum possible position in the focal plane 20 during the autofocusing, but instead arranging the object in z direction separated from the focal plane 20 by a predetermined object displacement Δz (for example 5 μm), as is shown schematically in FIG. 13. This approach is described in more detail for example in DE 102008005356 A1, the content of which is incorporated herein by reference. In the case of the object 3 assumed here according to FIG. 10, an aerial image according to FIG. 14 would be obtained. The intensity modulation is reduced, with the result that in the determination of the site of the best focusing BF using the contrast profile according to FIG. 15 an error of only ΔBF=38 nm would occur.

However, it has been shown that the intensity fluctuations occurring in the aerial image 23 depend greatly on the grating period of the grating 13 as well as the grating period of the regular structures of the object 3. If, e.g. in the case of the contact hole mask 3 shown in FIG. 10, the contact holes and the distances between them become smaller, this results in the contrast profiles shown in FIGS. 16 and 17, wherein FIG. 16 shows the contrast profile without displacement of the object relative to the object plane 20 according to FIG. 12 (thus Δz=0) and FIG. 17 shows the contrast profile with displacement (Δz=5 μm) according to FIG. 15. In this case, the error ΔBF in the determination of the site of the best focusing BF according to FIG. 16 is only 24 nm, whereas it is −50 nm according to FIG. 17.

In order to now achieve with certainty a reduction of the error ΔBF in the determination of the site of the best focusing BF for differently structured objects 3, the control unit 24 controls the object stage 11 during the recording (first exposure time) of the aerial image 23 (first two-dimensional image) such that the object stage 11 is moved in x direction (transverse to the grating lines of the grating 13 projected onto the object 3). This is a movement at preferably constant speed during the exposure (first exposure time) of the CCD two-dimensional sensor S. For the case without object displacement (Δz=0) this results in an aerial image according to FIG. 18 and a contrast profile according to FIG. 19. The error ABF in the determination of the site of the beat focusing BF is then only 2 nm with parameters comparable to the example described in conjunction with Figs. 11 and 12 in which the error was 191 nm.

FIG. 20 shows the aerial image for the case according to FIG. 13 (object displacement Δz=5 μm), wherein however the lateral movement has again been carried out while recording the image, resulting in the contrast profile shown in FIG. 21. Here, the error is now only 10 nm compared with the original 38 nm. Thus even with the variant with the predetermined object displacement Δz of the object 3 relative to the focal plane 20 a clear improvement in the determination of the site of the best focusing is achieved.

In FIG. 22 the autofocus contrast with the procedure according to the invention of the lateral movement of the object 3 in the pictures is plotted along the Y-axis as a function of the chosen object displacement Δz, which is plotted along the X-axis, for different intervals between the contact surface maskings 25.

The curve K1 relates to a distance between the contact hole maskings 25 of 1 μm, the curve K2 relates to a contact hole masking distance of 3 μm and the curve K3 one of 9 μm. The curve K4 is drawn in as comparison and relates to an object without contact hole maskings. As can be seen from the curves, the autofocus contrast depends greatly on the structuring of the object 3 as well as on the object displacement.

In FIG. 23, the error ΔBF in the determination of the site of the best focusing BF is plotted along the Y-axis as a function of the object displacement Δz along the X-axis for the curves Kl-K4. Here also, the marked fluctuations as a function of the structuring and the object displacement Δz can clearly be seen. Depending on the situation, a degree of object displacement can lead to a very good result. However, this is to be regarded more as a matter of chance. The best results are achieved with an object displacement Δz of 0 μm, as can be seen in FIGS. 22 and 23.

The speed of the object stage 11 is plotted as a function of time in FIG. 24. After an acceleration phase $t_{A1}$ and a buffer time $t_{B1}$, the CCD two-dimensional sensor is exposed during the time $t_E$. This is followed by a further buffer time $t_{B2}$ as well as a deceleration phase $t_{A2}$. A movement at a constant speed during the exposure of the CCD two-dimensional sensor can be ensured by this kind of controlling of the object stage 11.

After the determination of the defocusing BF the object 3 is focused (for example by changing the z position of the stage 11) and thereafter a second two-dimensional image of the object 3 is recorded via the imaging lens system 9 and the CCD camera 10. During the second exposure time for recording the second image, the object 3 is not moved.

A number of implementations have been described. Nevertheless, it will be understood that various modifications may be made. For example, elements of one or more implementations may be combined, deleted, modified, or supplemented to form further implementations. In addition, other components may be added to, or removed from, the described systems. Accordingly, other implementations are within the scope of the following claims.

What is claimed is:
1. An autofocus device for an imaging device, which has an imaging lens system with a first focal plane, an object stage for holding an object and a first movement module for the relative movement of object stage and imaging lens system, wherein the autofocus device comprises:

an image-recording module with a second focal plane the position of which relative to the first focal plane is known, a second movement module for the relative movement of object stage and image-recording module, a focus module for producing a two-dimensional, intensity-modulated focusing image in a focus module plane which intersects the second focal plane, and a control module which controls the image-recording module, which then records a first two-dimensional image of the object together with the focusing image during a predetermined first exposure time period, and wherein the control module, using the first two-dimensional image recorded by means of the image-recording module and taking into account the relative position of the first and second focal planes, evaluates the required change in distance between the object stage and the imaging lens system and controls the first movement module such that the evaluated change in distance is carried out for focusing the imaging device, wherein the control module is configured to control the second movement module such that, during the first exposure time period for recording the first two-dimensional image, the object stage is moved relative to the image-recording module in a plane parallel to the second focal plane.

2. The autofocus device according to claim 1, wherein the control module controls the second movement module such that, during the first exposure time, the object stage is moved relative to the image-recording module at a constant speed.

3. The autofocus device according to claim 1, wherein the control module controls the second movement module such that, during the first exposure time, the object stage is moved relative to the image-recording module in a single direction.

4. The autofocus device according to claim 1, wherein the control module controls the second movement module such that, during the first exposure time, the object stage is moved relative to the image-recording module in at least two different directions.

5. The autofocus device according to claim 1, wherein the focusing image is periodically intensity-modulated in a first direction and the control module controls the second movement module such that, during the first exposure time, the object stage is moved relative to the image-recording module in a second direction which is not perpendicular to the projection of the first direction onto the second focal plane.

6. The autofocus device according to claim 1, wherein the control module controls the second movement module such that, during the first exposure time, the object stage covers a distance relative to the image-recording module in which the movement distance corresponds to a dimension of the image field of the image-recording module.

7. The autofocus device according to claim 1, wherein the object has periodically arranged structures and the control module controls the second movement module such that, during the first exposure time, the object stage covers a distance relative to the image-recording module which is greater than or equal to the period length of the periodically arranged structures.

8. The autofocus device according to claim 1, wherein the first and second focal plane coincide.

9. The autofocus device according to claim 1, wherein the imaging lens system is used as image-recording module and the first and second movement module are the same module.

10. The autofocus device according to claim 1, wherein, in order to evaluate the change in distance between the object stage and the imaging lens system, the control module evaluates the first two-dimensional image for intensity variations and/or the contrast trend.

11. The autofocus device according to claim 1, wherein, before the recording is carried out, the control module positions the object held on the object stage in the second focal plane by means of the second movement module.

12. The autofocus device according to claim 1, wherein, to record the first two-dimensional image, the image-recording module carries out a confocal detection, wherein at least one geometric dimension of the recorded focusing image is evaluated to establish the required change in distance between the object stage and the imaging lens system.

13. Use of the autofocus device according to claim 1 in the imaging device which has the imaging lens system with the first focal plane, the object stage for holding the object and the first movement module for the relative movement of the object stage and the imaging lens system in order to measure the distance between and/or the position of two or more marks of the object.

14. The autofocus device of claim 1 wherein when a surface of the object is positioned at a target position at a predetermined distance from the second focal plane, the two-dimensional, intensity-modulated focusing image is produced in a focus plane that intersects the second focal plane while structures at the surface of the object are imaged at the second focal plane blurrily, and wherein the control module is configured to control the second movement module to move the object stage relative to the image-recording module in a plane parallel to the second focal plane during the first exposure time period for recording the first two-dimensional image such that the first two-dimensional image and portions of a moving blurred image of the structures at the surface of the object are recorded by the image-recording module.

15. An autofocusing method for an imaging device which has an imaging lens system with a first focal plane, an object stage for holding an object and a movement module for the relative movement of object stage and imaging lens system, wherein an image-recording module is provided with a second focal plane the position of which relative to the first focal plane is known, a two-dimensional, intensity-modulated focusing image is produced in a focus module plane which intersects the second focal plane, and a first two-dimensional image of the object together with the focusing image is recorded by means of the image-recording module during a predetermined first exposure time period, the required change in distance between the object stage and the imaging lens system is evaluated using the first two-dimensional image recorded by means of the image-recording module and taking into account the relative position of the first and second focal plane and the movement module is controlled such that the evaluated change in distance is carried out, wherein during the first exposure time period for recording the first two-dimensional image, the object stage is moved relative to the image-recording module in a plane parallel to the second focal plane.

16. The autofocusing method according to claim 15, wherein, during the first exposure time, the object stage is moved relative to the image-recording module at a constant speed.

17. The autofocusing method according to claim 15, wherein, during the first exposure time, the object stage is moved relative to the image-recording module in a single direction.

18. The autofocusing method according to claim 15, wherein, during the first exposure time, the object stage is moved relative to the image-recording module in at least two different directions.

19. The autofocusing method according to claim 15, wherein the focusing image is periodically intensity-modulated in a first direction and, during the first exposure time, the object stage is moved relative to the image-recording module in a second direction which is not perpendicular to the projection of the first direction onto the second focal plane.

20. The autofocusing method according to claim 15, wherein, during the first exposure time, the object stage covers a distance relative to the image-recording module in which the movement distance corresponds to a dimension of the image field of the image-recording module.

21. The autofocusing method according to claim 15, wherein the object has periodically arranged structures and, during the first exposure time, the object stage covers a distance relative to the image-recording module which is greater than or equal to the period length of the periodically arranged structures.

22. The autofocusing method according to claim 15, wherein the first and second focal plane coincide.

23. The autofocusing method according to claim 15, wherein the imaging lens system is used as image-recording module.

24. The autofocusing method according to claim 15, wherein, in order to evaluate the change in distance between the object stage and the imaging lens system, the first two-dimensional image is evaluated for intensity variations and/or the contrast trend.

25. The autofocusing method according to claim 15, wherein, before the recording is carried out, the object held on the object stage is positioned in the second focal plane by means of the movement module.

26. The autofocusing method according to claim 15, wherein, to record the first two-dimensional image, the image-recording module carries out a confocal detection, wherein at least one geometric dimension of the recorded focusing image is evaluated to establish the required change in distance.

27. The autofocusing method of claim 15 wherein when a surface of the object is positioned at a target position at a predetermined distance from the second focal plane, the two-dimensional, intensity-modulated focusing image is produced at a focus plane that intersects the second focal plane while structures at the surface of the object are imaged at the second focal plane blurrily, and wherein during the first exposure time period for recording the first two-dimensional image, the object stage is moved relative to the image-recording module in the plane parallel to the second focal plane such that the first two-dimensional image and portions of a moving blurred image of the structures at the surface of the object are recorded by the image-recording module.

28. An imaging method for an imaging device which has an imaging lens system with a first focal plane, an object stage for holding an object and a movement module for the relative movement of object stage and imaging lens system, wherein an image-recording module is provided with a second focal plane the position of which relative to the first focal plane is known, a two-dimensional, intensity-modulated focusing image is produced in a focus module plane which intersects the second focal plane, a first two-dimensional image of the object together with the focusing image is recorded by means of the image-recording module during a predetermined first exposure time period, wherein during the first exposure time period for recording the first two-dimensional image, the object stage is moved relative to the image-recording module in a plane parallel to the second focal plane, and the required change in distance between the object stage and the imaging lens system is evaluated using the first two-dimensional image recorded by means of the image-recording module and taking into account the relative position of the first and second focal plane and the movement module is controlled such that the evaluated change in distance is carried out for focusing the imaging lens system, wherein, after carrying out the evaluated change in distance, a second two-dimensional image of the object is recorded by means of the imaging lens system and the object stage and/or the object is not moved relative to the imaging lens system in a plane parallel to the first focal plane during a second exposure time for recording the second two-dimensional image.

29. The imaging method of claim 28 in which when a surface of the object is positioned at a target position at a predetermined distance from the second focal plane, the two-dimensional, intensity-modulated focusing image is produced in the focus module plane that intersects the second focal plane while structures at the surface of the object are imaged at the second focal plane blurrily, and wherein during the first exposure time period for recording the first two-dimensional image, the object stage is moved relative to the image-recording module in the plane parallel to the second focal plane such that the first two-dimensional image and portions of a moving blurred image of the structures at the surface of the object are recorded by the image-recording module.

30. An imaging device comprising:

an autofocus device and an imaging lens system with a first focal plane, an object stage for holding an object, a first movement module for the relative movement of object stage and imaging lens system, wherein the autofocus device comprises an image-recording module with a second focal plane the position of which relative to the first focal plane is known, a second movement module for the relative movement of object stage and image-recording module, a focus module for producing a two-dimensional, intensity-modulated focusing image in a focus module plane which intersects the second focal plane and a control module which controls the image-recording module, which then records a first two-dimensional image of the object together with the focusing image during a predetermined first exposure time period, wherein the control module controls the second movement module such that, during the first exposure time period for recording the first two-dimensional image, the object stage is moved relative to the image-recording module in a plane parallel to the second focal plane and wherein the control module, using the first two-dimensional image recorded by means of the image-recording module and taking into account the relative position of the first and second focal plane, evaluates the required change in distance between the object stage and the imaging lens system and controls the first movement module such that the evaluated change in distance is carried out for focusing the imaging device, wherein the imaging device, after carrying out the evaluated change in distance, records a second two-dimensional image of the object by means of the imaging lens system, and wherein the object stage and/or the object is not moved relative to the imaging lens system in a plane parallel to the first focal plane during a second exposure time for recording the second two-dimensional image.

31. The imaging device of claim 30 in which when a surface of the object is positioned at a target position at a predetermined distance from the second focal plane, the two-dimensional, intensity-modulated focusing image is produced in the focus module plane that intersects the second focal plane while structures at the surface of the object are imaged at the second focal plane blurrily, and wherein during the first exposure time period for recording the first two-dimensional image, the object stage is moved relative to the image-recording module in the plane parallel to the second focal plane such that the first two-dimensional image and portions of a moving blurred image of the structures at the surface of the object are recorded by the image-recording module.

* * * * *